United States Patent [19]

Kindermann

[11] Patent Number: 4,827,676
[45] Date of Patent: May 9, 1989

[54] METHOD OF REMOVING THE PRIMARY PROTECTIVE COATING FROM AN OPTICAL WAVEGUIDE

[75] Inventor: Richard Kindermann, Backnang, Fed. Rep. of Germany

[73] Assignee: ANT Nachrichtentechnik GmbH, Backnang, Fed. Rep. of Germany

[21] Appl. No.: 693,975

[22] Filed: Jan. 23, 1985

Related U.S. Application Data

[62] Division of Ser. No. 542,163, Oct. 14, 1983, abandoned.

[30] Foreign Application Priority Data

Oct. 14, 1982 [EP] European Pat. Off. ......... EP 82 109 5023

[51] Int. Cl.$^4$ .............................................. B24B 19/00
[52] U.S. Cl. .................................. 51/281 R; 51/82 R; 51/328; 51/334; 81/9.51
[58] Field of Search ............ 51/23, 80 R, 80 N, 82 R, 51/83 R, 84 R, 206 R, 298, 334, 336, 281 R, 328, DIG. 10; 81/9.51; 29/564.4; 15/88

[56] References Cited

U.S. PATENT DOCUMENTS

| 1,215,482 | 2/1917 | Chamberlain . | |
|---|---|---|---|
| 2,021,421 | 11/1935 | Mason | 81/9.51 X |
| 2,225,200 | 12/1940 | Ames | 15/21 |
| 2,826,776 | 3/1958 | Peterson | 15/179 |
| 2,887,702 | 5/1959 | Freitag | 15/23 |
| 2,929,083 | 3/1960 | Davis | 15/4 |
| 3,095,768 | 7/1963 | Walstrom | 81/9.51 |
| 3,122,766 | 3/1964 | Peterson | 15/179 |
| 3,247,571 | 4/1966 | Mentzer | 29/33 R |
| 3,534,422 | 10/1970 | Carpenter et al. | 15/88 |
| 3,720,973 | 3/1973 | Bogese | 81/9.51 X |
| 4,046,298 | 9/1977 | Schroeder, Jr. | 225/2 |
| 4,048,765 | 9/1977 | Samuelson | 51/328 |

FOREIGN PATENT DOCUMENTS

151605 2/1981 Japan .

OTHER PUBLICATIONS

International Fiber Optics and Communications, vol. 3, No. 3/4, p. 5, column 1, 1982.
"Elektronikpraxis" [Practical Elektronicx], No. 8, p. 102, 1982.

Primary Examiner—Robert P. Olszewski
Attorney, Agent, or Firm—Spencer & Frank

[57] ABSTRACT

An abrasion device for removing a primary protective coating from an optical waveguide workpiece. The device includes two abrasive wheels each having an abrasive circumferential surface. The wheels are arranged axially parallel with their circumferential surfaces beside one another and are mounted for rotation in opposite directions relative to each other. The wheels are positioned on opposite sides of a region in which the workpiece is disposed to cause the primary protective coating ground off by tangential contact with the circumferential surface of each wheel as the wheels are rotated.

13 Claims, 2 Drawing Sheets

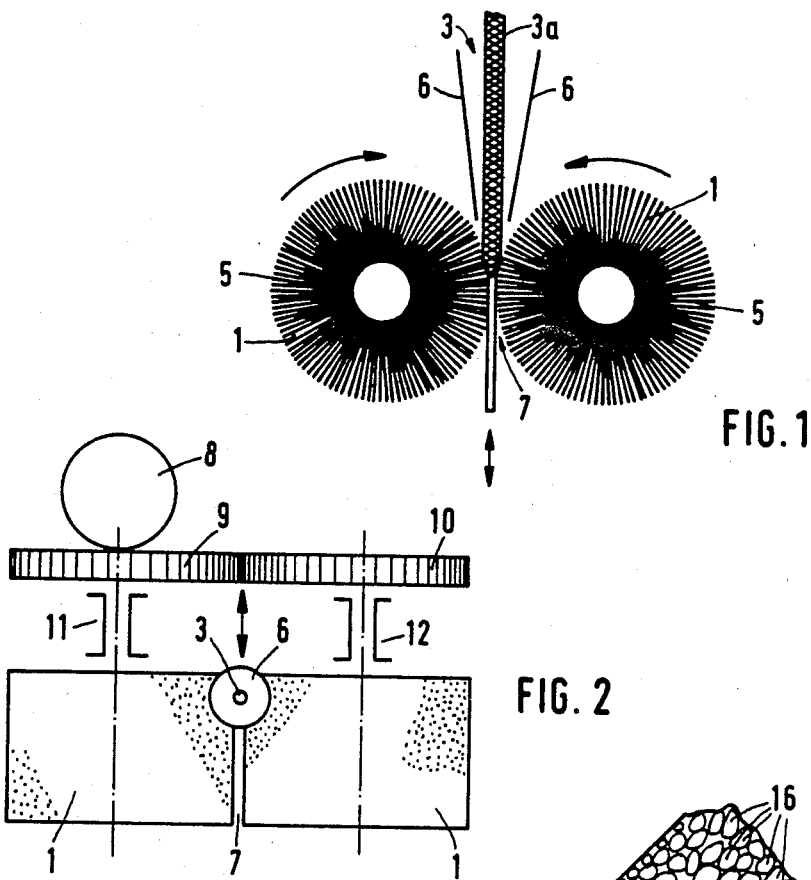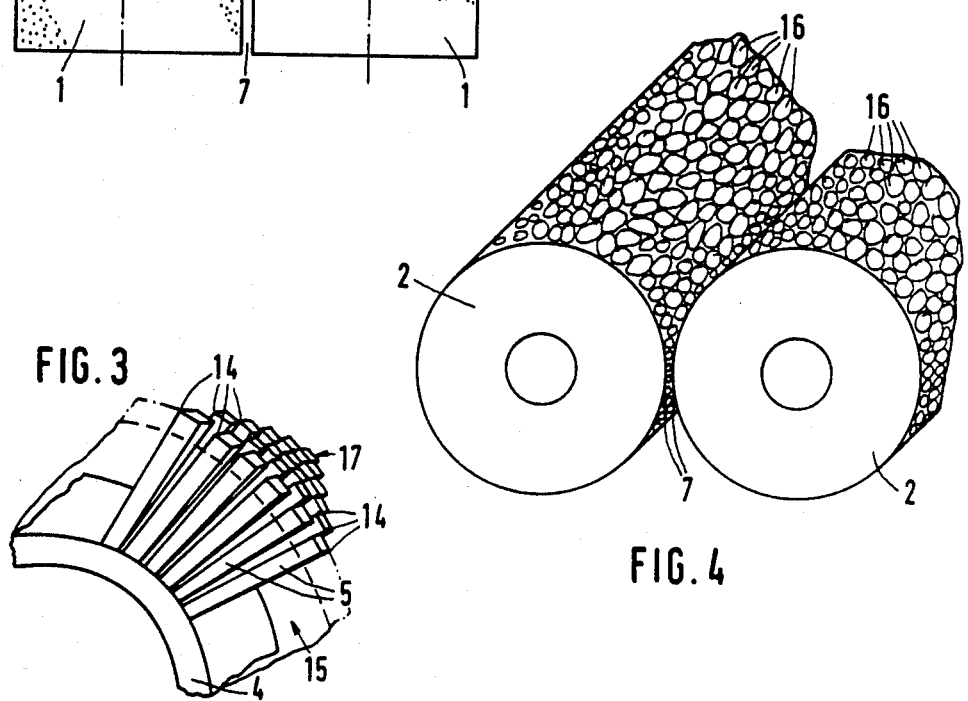

METHOD OF REMOVING THE PRIMARY PROTECTIVE COATING FROM AN OPTICAL WAVEGUIDE

This is a division of application Ser. No. 542,163, filed Oct. 14, 1983, now abandoned.

BACKGROUND OF THE INVENTION

The present invention relates to a device for removing the primary protective coating from an optical waveguide.

In the past, the primary protective coating has been removed from an optical waveguide by means of pickling agents that are health hazards, as for example, methylene chloride containing methanol. If neutralization is insufficient, these pickling agents produce a change in the properties of the surface regions of the optical waveguide, which may even lead to breakage of the optical waveguide, particularly in the region of the later point of separation between the pickled and the nonpickled protective coating.

Mechanical removability of special acrylic primary protective coating has also been proposed as discussed in, for example, (International Fiber Optics and Communications, Vol. 3, No. ¾, page 5, column 1, 1982). Moreover, "Elektronikpraxis" [Practical Electronics], No. 8, page 102, 1982, discloses an insulating box which permits work on an optical waveguide. In this insulating box, exchangeable cutting blades are arranged in the manner of a camera shutter. This insulating box with cutting blades has a very complicated configuration and, due to its structural size, cannot be used at many installation locations, e.g. in cable ducts. Moreover, it cannot be integrated with other cable work units, e.g. splicers.

SUMMARY OF THE INVENTION

It is therefore an object of the invention to design a device of the above-mentioned type in which the primary protective coating can be removed easily and cleanly without damage to the optical waveguide.

The above and other objects are accomplished by the invention which provides for a device for removing a primary protective coating from an optical waveguide workpiece which includes two abrasive wheels each having an abrasive circumferential surface. The wheels are arranged axially parallel with their circumferential surfaces beside one another. The wheels are mounted for rotation in opposite directions relative to each other and are positioned on opposite sides of a region in which the workpiece is to be disposed to cause the primary protective coating to be ground off by tangential contact with the circumferential surface of each wheel as the wheels are rotated.

The present invention has the advantage that it does not require the use of health endangering pickling agents. The processing time for removing the primary protective coating is shorter by about a factor of 4 compared to the pickling process. With the present invention it is possible to construct a simple, robust, maintenance free and inexpensive device which can be integrated with other work units for optical waveguides, for example splicing stations. When integrated in automatic or semi-automatic splicing stations, the splicing time can be shortened considerably. Since in the device according to the present invention, the optical waveguide is subjected only to tension stresses, the danger of breaking is reduced considerably.

BRIEF DESCRIPTION OF THE DRAWINGS

FIG. 1 is an end sectional view of one embodiment of an abrasion device having an optical waveguide workpiece inserted in accordance with the invention.

FIG. 2 is a top elevational view of the embodiment shown in FIG. 1 including drive elements.

FIG. 3 is a partial perspective view of components of the embodiment shown in FIG. 1.

FIG. 4 shows a partial perspective view of components of another embodiment of an abrasion wheel according to the invention.

DESCRIPTION OF THE PREFERRED EMBODIMENTS

Figure 5:
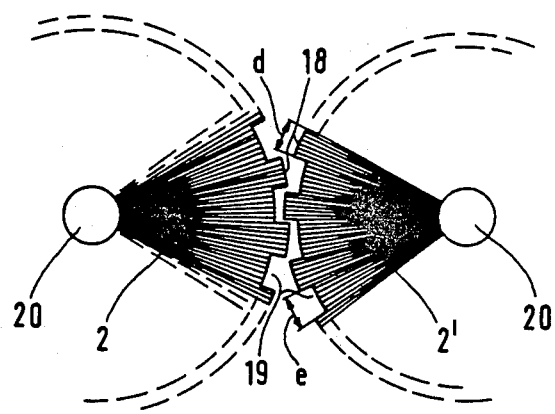
FIG. 5 is a front view of specially structured brushes.

FIG. 1 shows two brushes 1 which rotate counter to one another. An optical waveguide 3 with a primary protective coating 3a is introduced from the top through an insertion sleeve 6 into the air gap 7 between the circumferential surfaces of brushes 1. Insertion sleeve 6, shown in FIG. 1 as a funnel having a linear slope, serves to guide optical waveguide 3 tangentially between rotating brushes 1. Insertion funnel 6 may also have an exponential or some other steady profile. The insertion opening should be as large as possible, have a diameter of about 5 to 6 mm and, at the exit opening, should be adapted to the diameter of optical waveguide 3, including its primary protective coating 3a.

It is important for insertion sleeve 6 not to have any transverse groove since the presence of transverse grooves may cause optical waveguide 3 to be caught therein during insertion. The center axis of insertion sleeve 6 must lie in the center of air gap 7 between brushes 1.

Air gap 7 between brushes 1 is advisably selected in such a manner that the brush ends safely reach the bottom of the primary protective coating on optical waveguide 3. Thus, the diameter of the optical waveguide 3 without primary protective coating should be selected as the minimum spacing of brushes 1. Meshing of brushes 1 should be avoided since such meshing would considerably reduce the service life of the brushes and cause the driving power required for rotation of the brushes to be increased by a factor of 4 to 5 during meshing.

In one embodiment, brushes 1 comprise a cylindrical core 4 which is provided with tightly packed wires 5 oriented in the direction normal to cylindrical core 4. Wires made of V2A of a thickness of 0.06 to 0.1 mm diameter are suitable for such brushes. A value between 4 and $8 \times 10^3$ rpm has been found to be favorable for the rate of rotation of the brushes. V2A is a widely used trade name for a high-grade steel with alloying additions such as 8% nickel and 18% chrome.

FIG. 2 is a plan view of cylindrical brushes 1 and their drive elements. A motor 8 drives two gears 9 and 10. In order to keep the friction factor and the generated noise as low as possible, plastic wheels are preferably employed, for example those made of Delrin which is a trademark for linear polyoxymethylene type acetal resins. The first gear 9, the drive gear, is mounted to the shaft of motor 8 as is the left-hand brush 1 via fixed bearing 11. The second gear 10 is driven by first gear 9. The righthand brush 1 is attached on the shaft of gear 10 via a movable bearing 12. Thus brushes 1 rotate counter to one another. The brush diameters are selected to be approximately 0.2 mm larger than the pitch diameter of the gears. The modulus selected here is a value of 0.7 so as to have available enough adjustability for air gap 7.

The modulus m of the two gears 9 and 10 is given by the formula: $m = t/\pi$, wherein t represents the distance of two neighbouring tooth surfaces of a gear, measured on the height of the pitch diameter of the gear. A detailed explanation of modulus m is given e.g. in Dubbels, Taschenbuch für den Maschinenbau [pocketbook of mechanical engineering], XI. edition, 1953, page 658 or in DIN [German Industry Standard] Nos. 780, 868, or 870.

Insertion sleeve 6 is arranged to be movable over the width of the brushes, as indicated by the arrow in FIG. 2. The service life of the brushes can thus be increased considerably.

Optical waveguide 3 is guided tangentially between the counter rotating brushes 1. This causes primary protective coating 3a to be removed from optical waveguide 3 to the extent that the brushes pull the latter through the constricted region (air gap 7) between the two brushes 1. When optical waveguide 3 is pulled out of insertion sleeve 6, any remaining particles of protective coating 3a, as well as dust particles, are cleanly removed. The brushes throw the abraded material away from insertion sleeve 6 onto the floor, from where it can easily be removed.

FIG. 3 is a partial perspective view of a brush 1 constructed according to the invention. Brush 1 presents a ground surface 17 that is concentric to its drive shaft (not shown) on which is seated cylindrical core 4. Sharp edges 14 form at the ends of wires 5 due to the grinding. The grinding produces good rotational characteristics and thus uniform wear of the brushes and the sharp edges 14 produce a scraping or shaving effect which permits removal of protective coating 3a in the shortest possible time, approximately 2 to 3 seconds. Preferably, wires 5 have have a square or rectangular cross-section as illustrated in FIG. 3.

Embedding wires 5 in elastic material 15, such as plastic or the like, except for free ends 14, serves to better secure wires 5. The dashed line in FIG. 3 indicates the relative depth of plastic material 15. Thus it can be prevented that wires 5 escape during grinding. Also possible manufacturing flaws introduced during production of the brushes, for example as a result of different lengths of the wires, can be eliminated.

Instead of brushes 1, it is also possible to use grinding rollers 2, as shown in FIG. 4. Such grinding rollers 2 are made, for example, of elastic plastic rollers into which abrasive particles 16 have been embedded. Due to the elasticity of such grinding rollers, air gap 7 can be selected to be smaller than the diameter of the optical waveguide 3 without protective coating 3a. It is also possible to divide brushes 1 as well as the grinding rollers into segments and to provide brushing or grinding edges at the points of separation between the segments.

As for the plastic material 15 synthetic rubber on a silicone basis can be used. This material can also be used for the elastic grinding rollers 2. The relative depth of plastic material 15 will be 50%. That means, that the free ends 14 will outstrip the embedded wires by 50%. Concerning the abrasive particles a metal granulate can be used, such as chrome-nickel-steel. The grit size of this granulate may vary from 0.06 up to 0.08 mm. The granulate can be fixed on grinding rollers 2 by a commonly used adhesive material.

In order to increase the service life of the brushes, their outer surface region can be structured as shown in FIG. 5. Some portions 18 of the outer surface of brushes 2,2' are made higher than the rest portions 19. The brushes 2,2' are mounted on their shafts 20 in such a manner that a higher portion 18 of the one brush 2 meshes with a lower rest portion 19 of the other brush 2'. This meshing of brushes 2 and 2' is analogue to the meshing concerning gears but the brushes 2 and 2' are so constructed and are mounted in such a manner on their shafts 20 that there is no contact between them in the absence of an optical waveguide. Therefore the size of higher portions 18 of the brushes 2 and 2' have to be a little smaller than the lower rest portions 19. Preferably the length d of the higher portions 18 will be 5 mm and the length e of the lower rest portions 19 will be 6 mm. The difference in height between higher portions 18 and lower rest portions 19 is preferably 1 mm.

It will be understood that the above description of the present invention is susceptible to various modifications, changes and adaptations, and the same are intended to be comprehended within the meaning and range of equivalents of the appended claims.

What is claimed is:

1. A method for removing a primary protective coating from an optical waveguide workpiece, said method comprising:
   arranging two abrasive wheels, each of which has an abrasive circumferential surface, to be axially parallel with their circumferential surfaces beside one another and spaced apart;
   rotating the wheels in opposite directions relative to one another and;
   passing the workpiece between the wheels as they are rotating to cause the primary protective coating of the workpiece to be ground off by tangential contact with the circumferential surface of each wheel.

2. A method as claimed in claim 1, wherein said arranging step includes providing each abrasive wheel in the form of a rotatable brush.

3. A method as claimed in claim 2, wherein said arranging step further includes providing each brush with a cylindrical core constructed for being mounted onto a drive shaft, and tightly packed wires which extend outwardly in a direction normal to the cylindrical core.

4. A method as claimed in claim 3, wherein said arranging step further includes providing that the wires of each brush have free outwardly projecting end portions and providing that each brush includes an elastic material into which the wires, except for end portions, are embedded.

5. A method as claimed in claim 3, wherein said arranging step further includes providing that the circumferential surface of each brush presents a ground surface that is concentric with respect to the cylindrical core of a respective one of the brushes.

6. A method as claimed in claim 1, wherein said arranging step includes providing each abrasive wheel in the form of a grinding roller.

7. A method as claimed in claim 6, wherein said arranging step further includes providing that each grinding roller is formed of plastic and abrasive particles embedded in the plastic.

8. A method as claimed in claim 7, wherein said arranging step further includes providing that each grinding roller is constructed to be elastic.

9. A method as claimed in claim 1, and further including disposing an insertion sleeve for guiding the optical waveguide workpiece to the abrasive wheels.

10. A method as claimed in claim 9, wherein said arranging step includes providing an air gap between the abrasive wheels and said disposing step includes positioning the insertion sleeve in the center of the air gap.

11. A method according to claim 1, wherein said passing step includes removing the primary protective coating from the workpiece solely by the grinding caused by the tangential contact with the circumferential surface of each wheel.

12. A method of using an abrasion device for removing a primary protective coating from an optical waveguide workpiece wherein the device includes two abrasive wheels each having an abrasive circumferential surface, the wheels being arranged axially parallel with their circumferential surfaces beside one another, and being mounted for rotation in opposite directions relative to each other, said method including:
   rotating the wheels in opposite directions relative to one another; and
   passing the workpiece between the wheels as they are rotating to cause the primary protective coating of the workpiece to be ground off by tangential contact with the circumferential surface of each wheel.

13. A method according to claim 12, wherein said passing step includes removing the primary protective coating from the workpiece solely by the grinding caused by the tangential contact with the circumferential surface of each wheel.

* * * * *